A. L. BRAND.
NUT LOCK.
APPLICATION FILED JUNE 8, 1916.
1,210,758.
Patented Jan. 2, 1917.
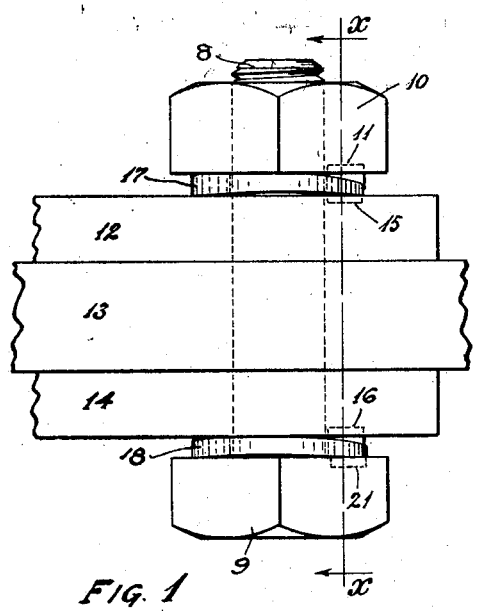
FIG. 1
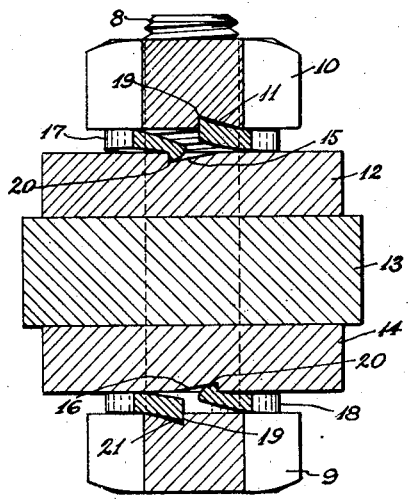
FIG. 2
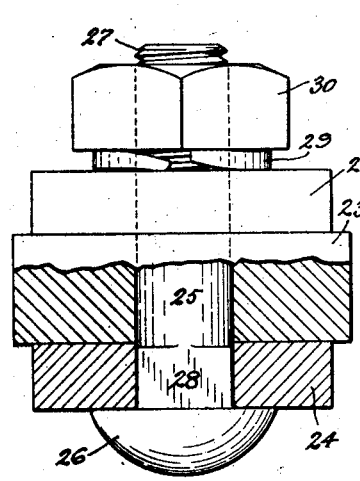
FIG. 5
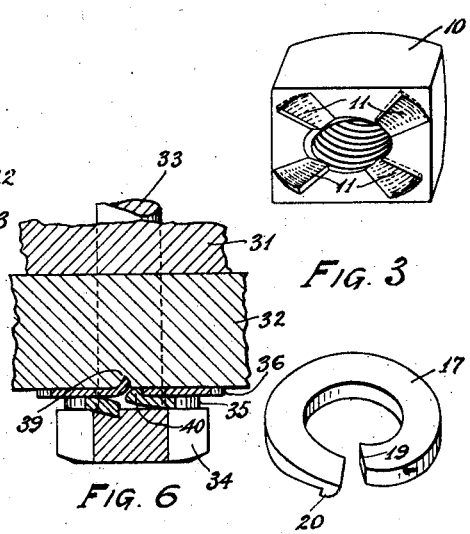
FIG. 6
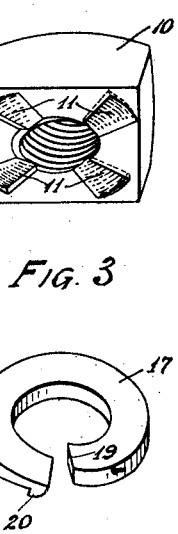
FIG. 3
FIG. 4
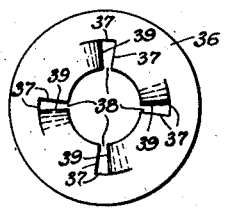
FIG. 7
WITNESS
O. Johnson
INVENTOR
Adolph L. Brand
BY
C. D. Haskins
ATTORNEY

UNITED STATES PATENT OFFICE.

ADOLPH L. BRAND, OF SEATTLE, WASHINGTON.

NUT-LOCK.

1,210,758.  Specification of Letters Patent.  Patented Jan. 2, 1917.

Application filed June 8, 1916. Serial No. 102,584.

*To all whom it may concern:*

Be it known that I, ADOLPH L. BRAND, citizen of the United States, residing at Seattle, in the county of King and State of Washington, have invented a certain new and useful Improvement in Nut-Locks, of which the following is a specification.

My invention relates to improvements in bolt and nut locks, and the object of my invention is to provide a bolt, a nut and washers which shall be of such forms of construction as will adapt them to be so disposed securely to bolt objects together that said bolt cannot rotatively move with respect to said object and said nut and washers cannot move with respect to said bolt in response to shocks and vibrations due to normal conditions of use of said objects; but, at times required, extraordinary force may be applied to rotate said nut in the operation of removing said bolt from said objects without injuring or destroying said bolt, said nut or said washers. I accomplish this object by devices illustrated in the accompanying drawings wherein—

Figure 1 is a view in side elevation of objects which are bolted together by a bolt and associated parts embodying my invention; Fig. 2 is a view of the same in vertical section on broken line $x$, $x$ of Fig. 1; Fig. 3 is a perspective view of a nut comprising a part of my invention; Fig. 4 is a perspective view of a split spring washer constituting a part of my invention; Fig. 5 is a view in side elevation of a modified form of bolt and associated parts embodying my invention as applied to objects that are bolted together thereby; Fig. 6 is a fragmentary view in vertical section of objects bolted together by my invention, only parts of which invention are shown and one of which parts may be advantageously used when one of the objects to be bolted together is of wood or other yielding material; and Fig. 7 is a plan view of one of the washers embodied in my invention.

Referring to the drawings, throughout which like reference numerals indicate like parts, 8 designates the screw-threaded shank of a bolt provided with a bolt-head 9 and a nut 10.

The nut 10, on its inner side surface, is provided with radial notches 11 extending from the edge of its screw-threaded hole nearly to the edges of its outer side surfaces, one radial side wall of each of said notches 11 being at a right angle with respect to the plane of the inner side surface of said nut 10, as shown more clearly in Fig. 3. The inner side surface of the bolt-head 9 is also provided with like radial recesses 21 which extend from the periphery of the shank of the bolt nearly to the edges of the outer side surfaces of said bolt-head 9. The shank 8 of the bolt is disposed to extend through objects 12, 13 and 14 with its screw-threaded end portion projected outwardly from the side surface of the object 12 and upon said outwardly projected end portion is screwed the nut 10. The outer side surface of the object 12 and the outer side surface of the object 14 are each provided with a notch, as notches 15 and 16 respectively, of a form similar to the form of the notches 11 of the nut 10 and of the inner surface of the bolt-head 9, which notches 15 and 16 extend radially from the circular edges of the hole through the objects 12, 13 and 14 within which is disposed the screw-threaded shaft 8 of the bolt. Disposed to surround the screw-threaded shank 8 of the bolt are washers 17 and 18, the washer 17 being disposed between the nut 10 and the object 12, while the washer 18 is disposed between the bolt-head 9 and the object 14. The washers 17 and 18 are both of the same form of construction, which form of construction is shown by a perspective view of the washer 17 in Fig. 4; the washer 18, as shown in Figs. 1 and 2 being in an inverted position with respect to the position of the washer 17, and each of the washers 17 and 18 being split radially, the portion adjacent to one side of the split being bent abruptly sidewise to form a sharp catching edge 19 while the portion on the other side of said split is bent sidewise in an opposite direction, but is made thinner and provided with a sidewise projecting catch 20 of a form that adapts it to act like a pawl when the washer is operatively disposed to surround the screw-threaded shank 8 in the manner shown in Figs. 1 and 2, whose said catches 20 of the washers 17 and 18 respectively engage with the vertical sides of the notches 15 and 16 in the objects 12 and 14 respectively, and wherein the catching edges 19 of said washers 17 and 18 engage respectively with the vertical side walls of the radial notches 11 and 21, all of which engagements result automatically in response to rotating the nut 10 with required force rigidly to bolt together the objects 12, 13 and 14, and when the objects 12, 13 and 14 are thus rigidly united the nut 10 cannot be rotated to unscrew it in response to shocks and constant vibrations of the objects 12, 13 and 14, nor can the bolt itself be rotated in response to such shocks and constant vibrations; but, if it be desired to remove the bolt from the objects 12, 13 and 14 it is only necessary to apply extraordinary force, by means of a wrench, either to the nut 10 or to the bolt-head 9 to unscrew the nut 10 from the bolt or to unscrew the bolt from the nut 10, in which operation the catches 20 in a cam-like manner will ride up the sloping wall of the respective one of the radial notches 15 and 16, springing the adjacent thinner portion of the washer away from the outer side surface of the adjacent one of the objects 12 and 14, said washer being rotated by reason of its sharp catching edge 19 being engaged with the vertical side wall of the respective one of the notches 11 and 21 in an obvious manner.

In Fig. 5 I have shown objects 22, 23 and 24 rigidly united by a bolt 25, that is provided with a bolt-head 26, a screw-threaded end portion 27, while a portion 28 of its shank that is adjacent to its bolt-head 26 is of square cross-section; the hole within which said bolt is disposed to extend through the three objects 22, 23 and 24 being of square cross-section only within that part of it which extends through the object 24 whereby said bolt cannot be rotatively moved with respect to the objects 22, 23 and 24. The screw-threaded end portion 27 that projects outwardly of the side surface of the object 22 is provided with a washer 29, that is like the washer 17, and with a nut 30 that is in all respect like the nut 10 of Figs. 1, 2 and 3, which washer 29 and nut 30 operate in all particulars like the washer 17 and nut 10, of Figs. 1 and 2, so that when the nut 30 has been forcibly rotated to bind the objects 22, 23 and 24 rigidly together no vibration or shock to which objects 22, 23 and 24 can be subjected will loosen or unscrew the nut 30, but if a wrench is applied with extraordinary force to unscrew the nut 30 the washer 29 will operate like the washer 17 to permit the nut 30 to rotate and carry with it said washer 29.

In Fig. 6, I have shown by fragmentary view, two objects 31 and 32 united by a bolt 33 extending therethrough, the object 32 being of wood or other yielding material. The screw-threaded portion of the bolt 33, for convenience of drawing is not shown, but may be assumed to be provided with a nut, like nut 10, and with a washer like the washer 17.

The bolt 33 is provided with a bolt-head 34 which is in all respects similar in construction to the bolt-head 9 of Figs. 1 and 2 and surrounding the shank of said bolt 33 adjacent to the inner surface of the bolt-head 34 is a washer 35 which is exactly like the washers 17 and 18 in form of construction, and like the washer 18 with respect to its position with relation to its adjacent bolt-head. Also surrounding the shank of the bolt 33, in a position between the washer 35 and the wooden object 32, is an auxiliary washer 36 of larger diameter than the washer 35, which auxiliary washer 36 is of the form shown by a plan view in Fig. 7, said washer 36 being provided with a plurality of cuts (formed by a die) each of which extends radially from its inner circular edge through about half of the distance to its outer circular edge, thence in a concentric circle for a short distance, as cuts 37 in Fig. 7, and a portion adjacent to the inner side of each of said cuts is bent sidewise from the plane of one side surface of said washer 36 to form radial slots 38 and radial projecting catches 39 which catches 39 are forcibly pressed into the surface of the wooden object 32 while any one of the slots 38 serve to receive the projecting catch 40 of the washer 35, as shown in said Fig. 6, when the nut of the bolt 33 is screwed rigidly to clamp together the objects 31 and 32.

Manifestly changes may be made in the forms, dimensions and arrangement of parts of my invention without departing from the spirit thereof.

What I claim is:

1. A bolt and nut lock of the class described, which embodies a bolt having a bolt-head whose inner side surface is provided with a plurality of radial notches extending from its shank to a point near the edges of its outer side surfaces; a nut whose inner surface is provided with a plurality of radial notches extending from the edge of its screw-threaded hole to a point near the edges of its outer side surfaces; two washers adapted to surround and freely fit the shank of said bolt, both of said washers being split radially and each having that portion of it adjacent to one side of said split bent abruptly sidewise to form a sharp catching edge, while its portion adjacent to the other side of said split is bent sidewise in an opposite direction, said latter portion being thinner and provided with an outwardly projecting catch of a form that adapts it to serve as a pawl when disposed within one of said radial notches of said bolt-head and said nut; and an auxiliary washer adapted to surround and freely fit the shank of said bolt, said auxiliary washer being provided with radial slots and sidewise projecting catches which extend from its inner circular edge toward its outer circular edge.

2. A bolt and nut lock of the class described, which embodies a bolt having a bolt-head whose inner side surface is provided with a plurality of radial notches extending from its shank to a point near the edges of its outer side surface; a nut whose inner surface is provided with a plurality of radial notches extending from the edge of its screw-threaded hole to a point near the edges of its outer side surfaces; and two washers adapted to surround and freely fit the shank of said bolt, both of said washers being split radially and each having that portion of it adjacent to one side of said split bent abruptly sidewise to form a sharp catching edge, while its portion adjacent to the other side of said split is bent sidewise in an opposite direction, said latter portion being thinner and provided with an outwardly projecting catch of a form that adapts it to serve as a pawl when disposed within one of said radial notches of said bolt-head and said nut.

In witness whereof, I hereunto subscribe my name this 29th day of May, A. D. 1916.

ADOLPH L. BRAND.

Witnesses:
FRANK WARREN,
O. JOHNSON.